(12) United States Patent
Browne et al.

(10) Patent No.: US 6,937,239 B1
(45) Date of Patent: Aug. 30, 2005

(54) METHOD AND APPARATUS FOR ORIENTATING A CHARACTER STROKE

(75) Inventors: Cameron Bolitho Browne, Burleigh Heads (AU); Michael Richard Arnold, Surry Hills (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/379,722

(22) Filed: Aug. 24, 1999

(30) Foreign Application Priority Data

Aug. 28, 1998 (AU) .................................. PP 5578

(51) Int. Cl.[7] .......................... G06T 11/00; G06T 11/20
(52) U.S. Cl. ...................................... 345/467; 345/442
(58) Field of Search ............................... 345/442, 441, 345/467, 474, 419

(56) References Cited

U.S. PATENT DOCUMENTS

| | | | |
|---|---|---|---|
| 5,608,855 A * | 3/1997 | Harashima | 345/442 |
| 5,611,036 A * | 3/1997 | Berend et al. | 345/441 |
| 5,636,338 A * | 6/1997 | Moreton | 345/442 |
| 5,734,384 A | 3/1998 | Yanof et al. | 345/424 |
| 5,751,853 A | 5/1998 | Michael | 382/203 |
| 5,771,035 A | 6/1998 | Imaki et al. | 345/143 |
| 5,940,082 A * | 8/1999 | Brinegar et al. | 345/442 |
| 6,111,588 A * | 8/2000 | Newell | 345/442 |
| 6,268,871 B1 * | 7/2001 | Rice et al. | 345/442 |

FOREIGN PATENT DOCUMENTS

EP 0 120 598 10/1984

* cited by examiner

*Primary Examiner*—Sumati Lefkowitz
*Assistant Examiner*—Chante Harrison
(74) *Attorney, Agent, or Firm*—Fitzpatrick, Cella, Harper & Scinto

(57) ABSTRACT

Disclosed is a method of orientating a space curve having two endpoints. The method comprises selecting a desired direction and then generating a first vector having a direction which is same as the selected desired direction. At least one second vector is then generated, each said second vector having a corresponding direction indicative of a corresponding characteristic of the space curve. The first and second vectors are compared so as to determine a direction of the space curve, wherein the determined direction of the space curve is along the curve from the first endpoint to the second endpoint and which is closest to the selected desired direction. The direction of the space curve is then oriented in accordance with the determined direction.

87 Claims, 13 Drawing Sheets

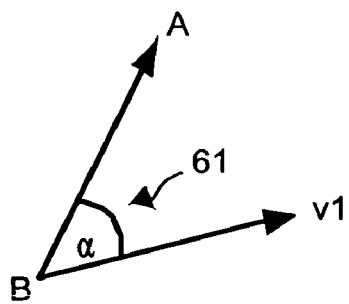
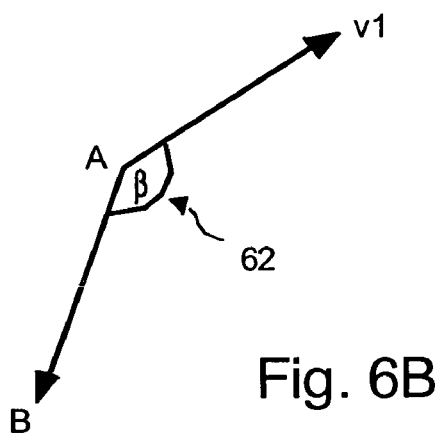
Fig. 6A               Fig. 6B
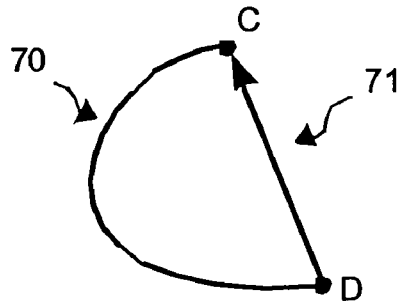
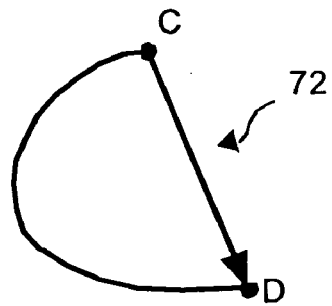
Fig. 7A               Fig. 7B
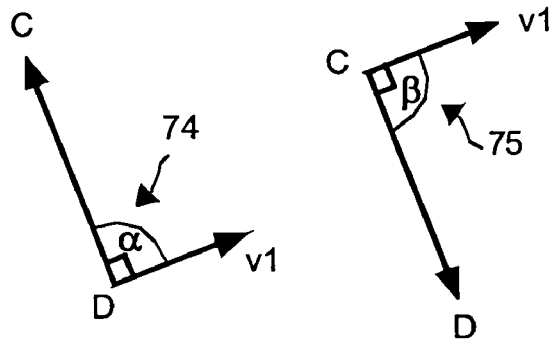
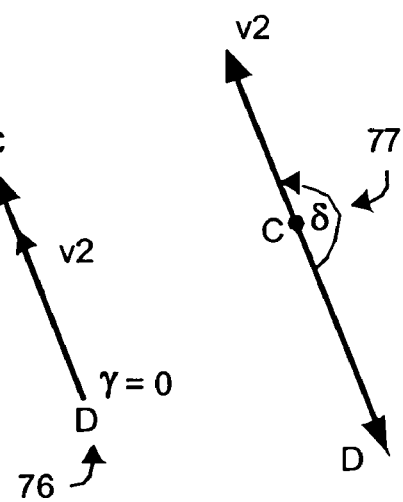
Fig. 7C      Fig. 7D      Fig. 7E      Fig. 7F

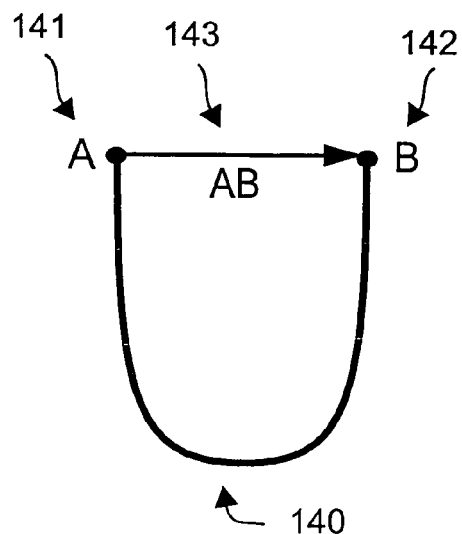
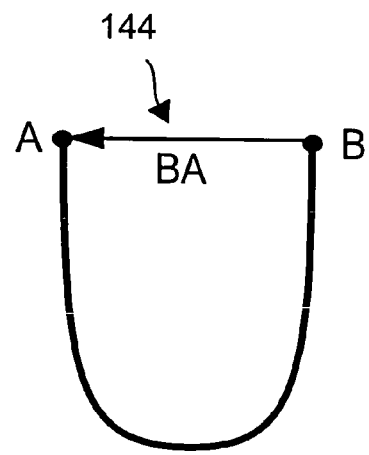
Fig. 14A                    Fig. 14B
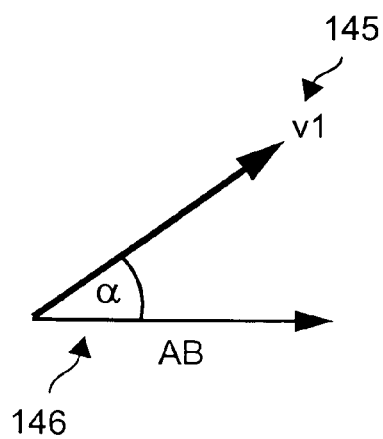
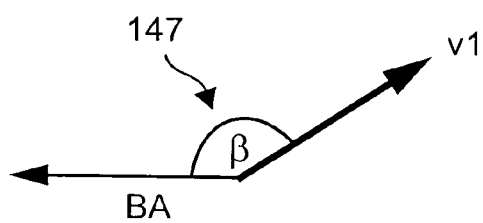
Fig. 14C                    Fig. 14D

METHOD AND APPARATUS FOR ORIENTATING A CHARACTER STROKE

FIELD OF INVENTION

The present invention relates to a method and apparatus for orientating a character stroke. The invention also relates to a computer program product comprising a computer readable medium including a computer program for orientating a character stroke. The invention further relates to a method and apparatus for orientating a space curve, including a computer program product therefor.

BACKGROUND

U.S. Pat. No. 5,771,035 discloses a character generation device for producing new fonts from a basic font and paste components. The device has a shape recogniser for extracting an element of a character of the basic font and recognising it's shape. The shape recogniser determines the stroke angle of the element and the paste components are superposed at the angle matching the angle of the stroke. The device allows the easy generation of characters of a font without manually designing each character. However, this device suffers from the disadvantage that it is not possible to manipulate the stored basic font, particularly the orientation of character strokes.

SUMMARY OF THE INVENTION

It is an object of the present invention to ameliorate one or more disadvantages of the prior art.

According to one aspect of the present invention there is provided a method of orientating a space curve, wherein the space curve has two endpoints, the method comprising the steps of: (i) selecting a desired direction; (ii) generating a first vector having a direction which is same as the selected desired direction; (iii) generating at least one second vector, each said second vector having a corresponding direction indicative of a corresponding characteristic of the space curve; (iv) comparing the first and second vectors so as to determine a direction of said space curve, wherein said determined direction of said space curve is along said curve from a first said endpoint to a second said endpoint and which is closest to said selected desired direction; and (v) orientating said direction of said space curve in accordance with said determined direction.

According to another aspect of the present invention there is provided a method of orientating a finite n-dimensional space curve, wherein the space curve has two endpoints, the method comprising the steps of: (i) selecting a desired direction in response to user input; (ii) generating a first vector having a direction which is same as the selected desired direction; (iii) generating at least one second vector based upon the finite n-dimensional space curve; (iv) comparing the first and second vectors so as to determine a direction of said space curve, wherein said determined direction of said space curve is along said curve from a first said endpoint to a second said endpoint and which is closest to said selected desired direction; and (v) orientating said finite n-dimensional space curve to the determined direction.

According to still another aspect of the present invention there is provided a method of orientating a character stroke, the method comprising the steps of: (i) selecting a desired direction for orientating the character stroke; (ii) generating a first vector having a direction which is same as the selected desired direction; (iii) generating a space curve representative of the character stroke, wherein the space curve has two endpoints; (iv) generating two second vectors, each connecting both said endpoints and having opposite directions; (v) comparing the first and second vectors so as to determine a direction of said space curve, wherein said determined direction of said space curve is along said curve from a first said endpoint to a second said endpoint and which is closest to said selected desired direction; and wherein said comparing step comprises the sub-steps of: (v)(a) determining a first angle between one of said two second vectors and said first vector; (v)(b) determining a second angle between the other one of said two second vectors and said first vector; and (v)(c) comparing said first angle with said second angle; wherein if said first angle is less than said second angle then the determined direction of the space curve is in a first direction, and if said first angle is greater than said second angle then the determined direction of the space curve is in a second direction, opposite the first direction; (vi) orientating said direction of said space curve in accordance with said determined direction; and (vii) orientating the character stroke in accordance with the direction of the space curve.

According to still another aspect of the present invention there is provided apparatus for orientating a space curve, wherein the space curve has two endpoints, the apparatus comprising: selection means for selecting a desired direction; first generation means for generating a first vector having a direction which is same as the selected desired direction; means for providing a space curve; second generation means for generating at least one second vector, each said second vector having a corresponding direction indicative of a corresponding characteristic of the space curve; comparing the first and second vectors so as to determine a direction of said space curve, wherein said determined direction of said space curve is along said curve from a first said endpoint to a second said endpoint and which is closest to said selected desired direction; and orientation means for orientating said direction of said space curve in accordance with said determined direction.

According to still another aspect of the present invention there is provided apparatus for orientating a finite n-dimensional space curve, wherein the space curve has two endpoints, the apparatus comprising: means for selecting a desired direction in response to user input; means for generating a first vector having a direction which is same as the selected desired direction; means for providing a n-dimensional space curve; means for generating at least one second vector based upon the finite n-dimensional space curve; means for comparing the first and second vectors so as to determine a direction of said space curve, wherein said determined direction of said space curve is along said curve from a first said endpoint to a second said endpoint and which is closest to said selected desired direction; and means for orientating said finite n-dimensional space curve to the determined direction.

According to still another aspect of the present invention there is provided apparatus for orientating a character stroke, the apparatus comprising: means for selecting a desired direction for orientating the character stroke; means for generating a first vector having a direction which is same as the selected desired direction; means for generating a space curve representative of the character stroke, wherein the space curve has two; means for generating two second vectors, each connecting both said endpoints and having opposite directions; means for comparing the first and second vectors so as to determine a direction of said space curve, wherein said determined direction of said space curve is along said curve from a first said endpoint to a second said endpoint and which is closest to said selected desired direction; and wherein said comparison means comprising: means for determining a first angle between one of said two second vectors and said first vector; means for determining a second angle between the other one of said two second vectors and said first vector; and means for comparing said first angle with said second angle; wherein if said first angle is less than said second angle then the determined direction of the space curve is in a first direction, and if said first angle is greater than said second angle then the determined direction of the space curve is in a second direction, opposite the first direction; means for orientating said direction of said space curve in accordance with said determined direction; and means for orientating the character stroke in accordance with the direction of the space curve.

According to still another aspect of the present invention there is provided a computer program product comprising a computer readable medium having a computer program for orientating a space curve, wherein the space curve has two endpoints, the computer program product comprising: selection means for selecting a desired direction; first generation means for generating a first vector having a direction which is same as the selected desired direction; means for providing a space curve; second generation means for generating at least one second vector, each said second vector having a corresponding direction indicative of a corresponding characteristic of the space curve; first comparison means for comparing the first and second vectors so as to determine a direction of said space curve, wherein said determined direction of said space curve is along said curve from a first said endpoint to a second said endpoint and which is closest to said selected desired direction; and orientation means for orientating said direction of said space curve in accordance with said determined direction.

According to still another aspect of the present invention there is provided a computer program product comprising a computer readable medium including a computer program for orientating a finite n-dimensional space curve, wherein the space curve has two endpoints, the computer program product comprising: means for selecting a desired direction in response to user input; means for generating a first vector having a direction which is same as the selected desired direction; means for providing a n-dimensional space curve; means for generating at least one second vector based upon the finite n-dimensional space curve; means for comparing the first and second vectors so as to determine a direction of said space curve, wherein said determined direction of said space curve is along said curve from a first said endpoint to a second said endpoint and which is closest to said selected desired direction; and means for orientating said finite n-dimensional space curve to the determined direction.

According to still another aspect of the present invention there is provided a computer program product comprising a computer readable medium including a computer program for orientating a character stroke, the computer program product comprising: means for selecting a desired direction for orientating the character stroke; means for generating a first vector having a direction which is same as the selected desired direction; means for generating a space curve representative of the character stroke, wherein the space curve has two endpoints, means for generating two second vectors, each connecting both said endpoints and having opposite directions; means for comparing the first and second vectors so as to determine a direction of said space curve, wherein said determined direction of said space curve is along said curve from a first said endpoint to a second said endpoint and which is closest to said selected desired direction; and wherein said comparison means comprises: means for determining a first angle between one of said two second vectors and said first vector; means for determining a second angle between the other one of said two second vectors and said first vector; and means for comparing said first angle with said second angle; wherein if said first angle is less than said second angle then the determined direction of the space curve is in a first direction, and if said first angle is greater than said second angle then the determined direction of the space curve is in a second direction, opposite the first direction; means for orientating said direction of said space curve in accordance with said determined direction; and means for orientating the character stroke in accordance with the direction of the space curve.

BRIEF DESCRIPTION OF THE DRAWINGS

Embodiments of the invention are described with reference to the drawings, in which:

FIGS. 6A and 6B illustrate the relationship between end point vectors and the preferred direction vector;

FIGS. 7A to 7F illustrate the special case of ambiguous orientation and its solution using the second preferred direction vector;

FIGS. 14A to 14D illustrate a solution to the problem shown in FIG. 12 based on end point position;

DETAILED DESCRIPTION

Figure 1:
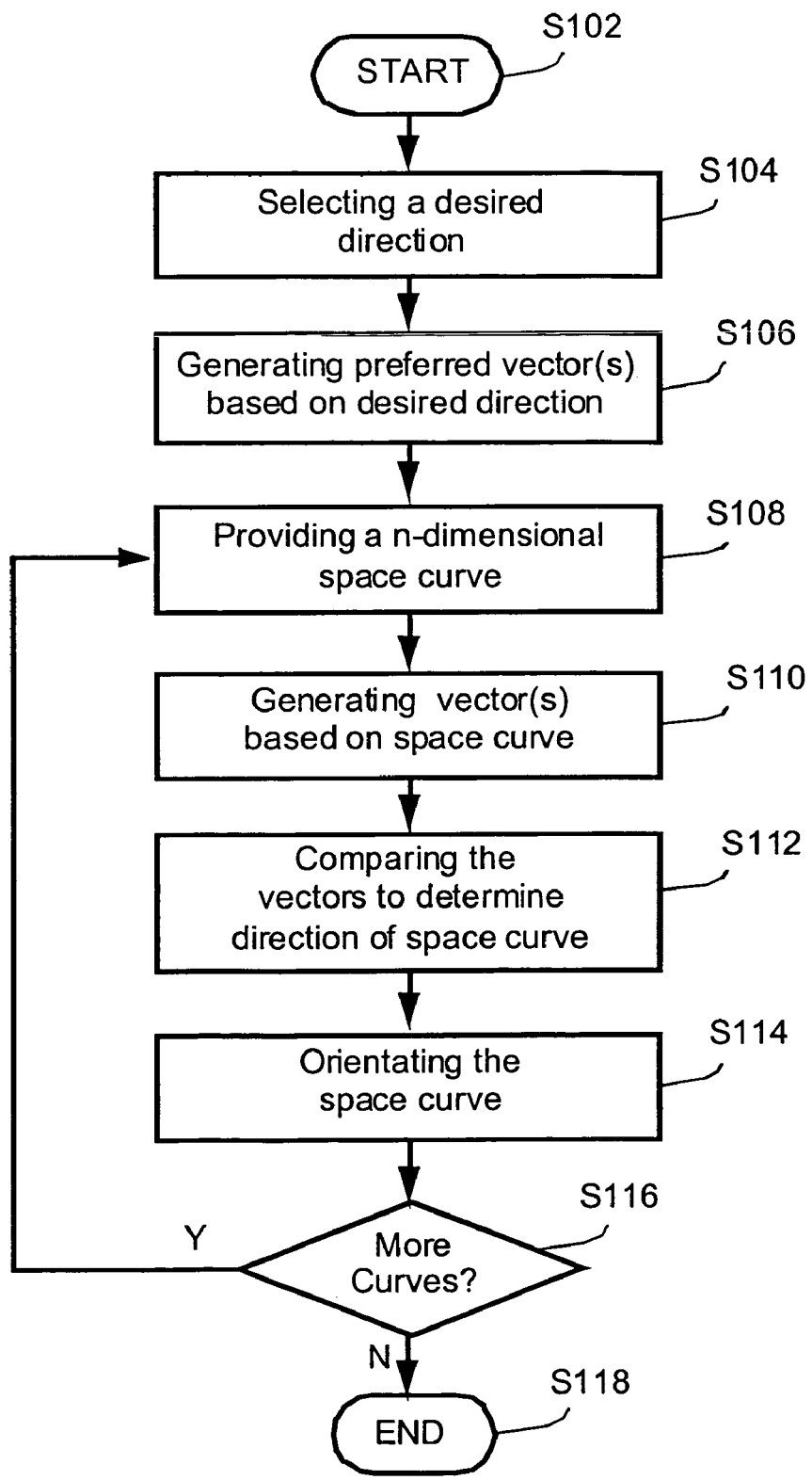
FIG. 1 is a flow diagram of a method of orientating an n-dimensional finite space curve in accordance with a preferred embodiment of the invention.

Where reference is made in any one or more of the drawings to steps and/or features which have the same reference numerals, those steps and/or features are for the purposes of the description the same, unless the contrary appears.

The principles of the preferred method have general applicability to n-dimensional finite space curves. However, for ease of explanation, 2-dimensional examples are also described, in particular the orientation of 2-dimensional curves that describe the paths of stroke-based typeface characters. It is not intended that the present invention be limited to these 2-dimensional examples. The preferred method can have application for generating and/or modifying typefaces, fonts, or characters suitable for display or printing but is not specifically limited thereto.

Some portions of the detailed descriptions which follow are explicitly or implicitly presented in terms of algorithms and symbolic representations of operations on data within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms, such as space curves, are to be associated with the appropriate physical quantities and are merely convenient labels applied to these quantities. Unless specifically stated otherwise as apparent from the following discussions, it is appreciated that throughout the present invention, discussions utilizing terms such as "selecting", "determining", "generating", "providing", "comparing", "orientating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. The algorithms and displays presented herein are not inherently related to any particular computer or other apparatus. Various general purpose machines may be used with programs in accordance with the teachings herein, or it may prove convenient to construct more specialized apparatus to perform the required method steps. The structure of a conventional general purpose computer will appear from the description below.

In addition, the present invention also relates to a computer program product comprising a computer readable medium including a computer program for orientating a space curve. The computer readable medium is taken herein to include any transmission medium for transmitting the computer program between a source and a designation. The transmission medium may include storage devices such as magnetic or optical disks, memory chips, or other storage devices suitable for interfacing with a general purpose computer. The transmission medium may also include a hard-wired medium such as exemplified in the Internet system, or wireless medium such as exemplified in the GSM mobile telephone system. The computer program is not described with reference to any particular programming language and implementation thereof. It will be appreciated that a variety of programming languages and implementations thereof may be used to implement the teachings of the invention as described herein.

FIG. 1 is a flow diagram of a method of orientating a n-dimensional finite space curve in accordance with a preferred embodiment of the invention. The preferred method allows orientation of a space curve in a simple and consistent manner with limited user input. The method commences at step S102 and any necessary processes and parameters are initialized. In the next step S104, the user selects a preferred direction for orientating the n-dimensional finite curve space. Alternatively, the preferred direction may be preset. The processing continues at the next step S106, where a preferred vector is generated having the same direction as the preferred direction. Also during this step, n−1 additional preferred vectors are generated from the preferred direction supplied by the user. Each of these additional preferred vectors is non-zero and is linearly independent of the other preferred vectors, thus forming a basis. Alternatively, the user may input each desired direction of these additional preferred vectors. In this way, any ambiguous result of orientating the space curve can be resolved. In the next step S108, an n-dimensional finite space curve is provided, which may be accessed from memory or may be implicitly generated. This n-dimensional space curve may be derived from the shape of a character. The processing continues at the next step S110, where one or more vector(s) based upon a characteristic of the space curve are generated. Preferably, the method automatically generates these vector(s) of the space curve according to a predetermined technique. Alternatively, the method can include a step (not shown) whereby a user is able to select the desired technique for generating the vector(s) of the space curve. These techniques and some typical examples of vectors of space curves are given in the examples described below. In the next step S112, a comparison is made between one or two vectors of space curves and the initial preferred vector to determine that direction of the space curve closest to the desired direction. If both vectors of the space curves are equally close then the additional preferred vectors are utilized to resolve the ambiguity. In step S114, the n-dimensional finite space curve is then orientated to that direction determined by step S112. During this step, the corresponding character can also be orientated in the same direction. In the decision box S116, a check is made whether any more space curves are to be processed. If the decision box returns true, the processing continues at step S108. Otherwise, the processing terminates at step S118. For a more detailed explanation of the preferred method reference is made to the following examples.

EXAMPLE(S)

Figure 2:
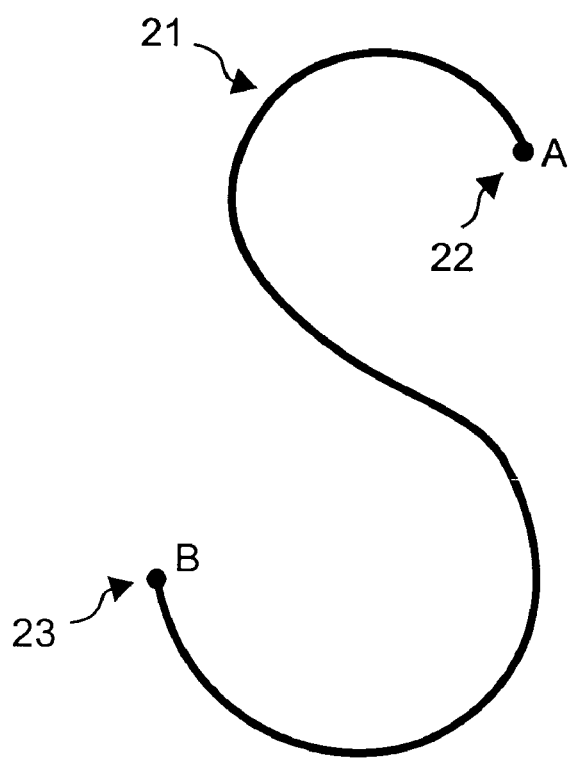
FIG. 2 illustrates an example 2-dimensional curve with end points labelled.

Turning initially to FIG. 2, there is shown a sample 2-dimensional space curve describing the stroke path 21 of the character "S". Two end points A 22 and B 23 have been labelled, and the curve is not oriented at this stage. The end points are selected such that all points along the curve lie within the interval formed by these end points. This 2-dimensional curve is derived from a complex character shape "S". Any of the known processes for obtaining the stroke path from the character shape would be suitable. This complex character shape may be stored in memory for processing by the preferred method. Alternatively, the complex character shape may be implicitly generated.

Figure 3:
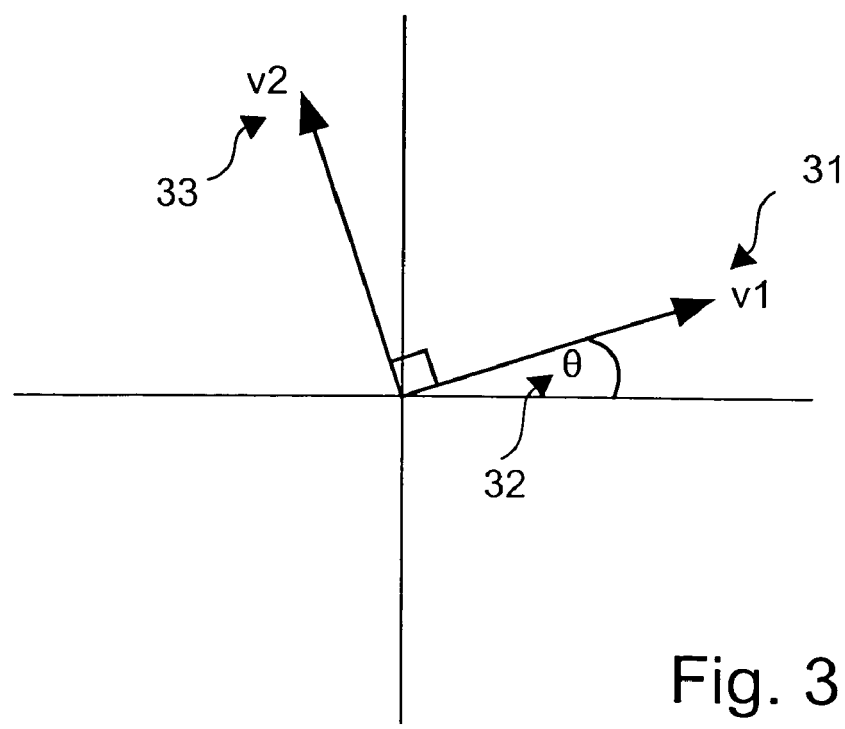
FIG. 3 illustrates an example set of two preferred direction vectors for the 2-dimensional case.

Turning to FIG. 3, there is shown the "preferred vector" v1 31 that describes an angle theta 32 with the X-axis. The angle theta is supplied by the user as a single continuous-value parameter, and controls the overall orientation that is enforced on the set of curves to be oriented. A "second preferred vector" v2 33 is calculated relative to v1 such that it is orthogonal to v1 and lies in the 2-dimensional plane occupied by the set of curves to be oriented. The second preferred vector is used to resolve cases where the preferred vector yields an ambiguous solution. The direction of orthogonality (left orthogonal or right orthogonal in the 2-dimensional case) is not important provided that the same convention is used consistently. Note that if the second preferred vector is non-zero and linearly independent of the preferred vector, then ambiguity resolution is guaranteed. Alternatively, other types of non-zero linearly independent vectors may be used instead of orthogonal vectors.

For the general case of n-dimensional curves, n−1 additional preferred vectors are calculated from the initial preferred vector provided by the user, such that each successive preferred vector is non-zero and linearly independent of preceding preferred vectors, forming a basis.

Figure 4:
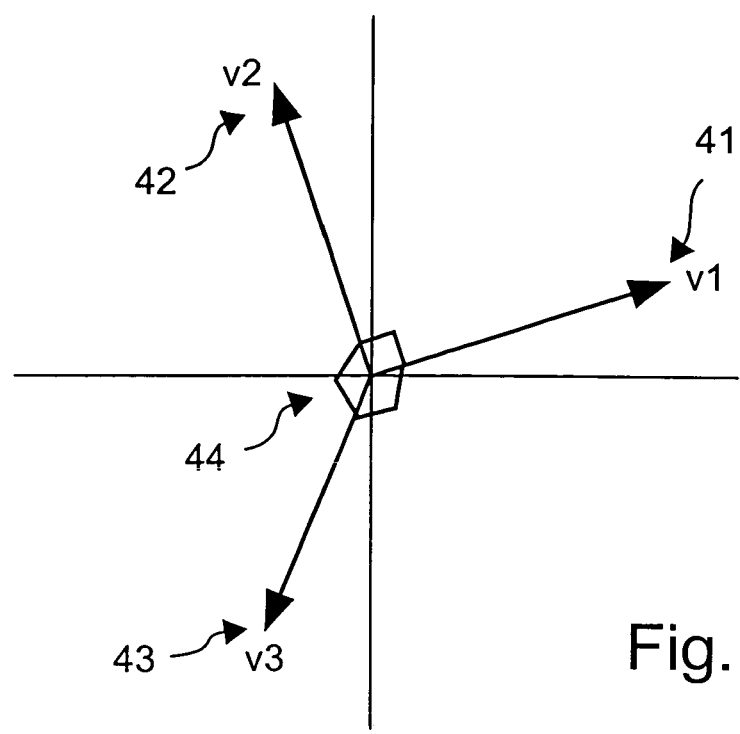
FIG. 4 illustrates an example set of three preferred direction vectors for the 3-dimensional case.

For instance, FIG. 4 shows a preferred vector set for a 3-dimensional example. There is shown v1 41, the initial preferred vector nominated by the user, v2 42 the second preferred vector that is orthogonal to v1, and v3 43 the third preferred vector that is orthogonal to both v1 and v2 44. The second preferred vector is used to resolve cases where the preferred vector gives an ambiguous solution, and the third preferred vector is used to resolve cases where the preferred and second preferred vectors both give ambiguous results. This chain of ambiguity resolution can be extended to n preferred vectors in n-dimensions as required. The preferred vectors need not be orthogonal to previous preferred vectors, but must be non-zero and linearly independent of previous preferred vectors. Any number of vectors may be specified (either linearly dependent or independent) provided that this set includes at least n linearly independent vectors.

Figure 5A:
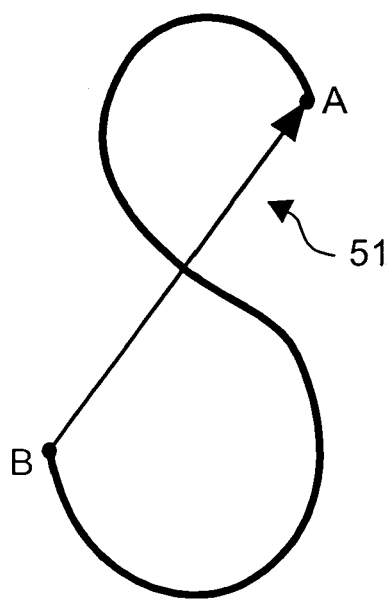
FIGS. 5A and 5B illustrate vectorial relationships between the curve end points.
Figure 5B:
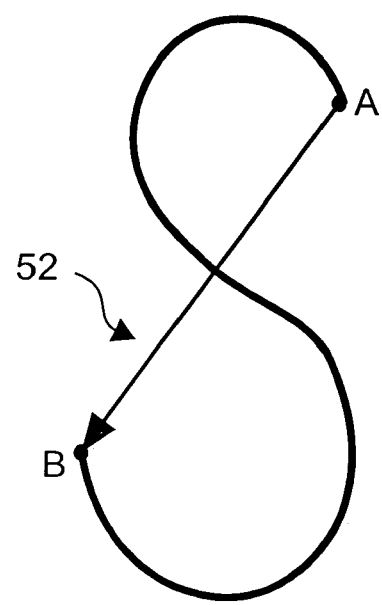

Referring to FIGS. 5A and 5B, there are illustrated two arrangements of the planar figure 21 based upon its end points A 22 and B 23 (FIG. 2). The first arrangement (FIG. 5A) shows the end points related by the vector BA 51, and the second arrangement (FIG. 5B) shows the end points related by the vector AB 52. This is one way to derive the "characteristic vector" based upon the curve's characteristics, and its "matching" vector, which in this case is co-linear with and in an opposite direction to the characteristic vector. Any process that describes the curve in terms of a single characteristic vector may be applied, for instance integrating the curve to obtain the average direction vector.

Turning now to FIGS. 6A and 6B, there are shown the angles alpha 61 and beta 62 given by the acute angle between vectors BA and v1, and vectors AB and v1 respectively. The relative magnitudes of angles alpha and beta define the final orientation of the curve, and can be conveniently calculated as the dot product of the vector pairs. If the magnitude of alpha is less that the magnitude of beta then the curve is described as being oriented "from B to A", and if the magnitude of alpha is greater than the magnitude of beta then the curve is described as being oriented "from A to B". Alternatively, the magnitude of alpha can be compared against a threshold of 90°. If alpha is less than 90° the direction of the curve is "from B to A". If alpha is greater than the 90° threshold then the direction of the curve is "from A to B".

In the case that alpha and beta are of equal magnitude (the dot product is 0 in both cases), then the second preferred vector v2 can be used to resolve this ambiguity, as shown in FIGS. 7A to 7F. The end points of the 2-dimensional curve 70 are related by the vectors DC 71 and CD 72, but the acute angles alpha 74 and beta 75 formed by these vectors and the preferred vector v1 are identical (both give a dot product of 0). The second preferred vector v2 is now used as follows. The acute angles gamma 76 and delta 77 formed by the vectors DC and CD and v2 are calculated, and their relative magnitude is used to determine the curve's orientation in a manner similar to the comparison between alpha and beta. That is, if the magnitude of gamma is less that the magnitude of delta then the curve is described as being oriented "from D to C", and if the magnitude of gamma is greater than the magnitude of delta then the curve is described as being oriented "from C to D". For the 2-dimensional case, if alpha and beta are of equal magnitude then it is not possible for gamma and delta to also be of equal magnitude. Alternatively, the magnitude of gamma can be compared against a threshold of 90°. If gamma is less than 90° the direction of the curve is "from D to C". If gamma is greater than the 90° threshold then the direction of the curve is "from C to D".

For the general case of an n-dimensional curve, the coordinates of the difference vector AB in the basis formed by the set of linearly independent preferred vectors is non zero when A is not equal to B. Here, the process is to choose the orientation "from A to B" if the first non-zero coordinate is positive, and choose the orientation "from B to A" if the first non-zero coordinate is negative. It is not possible for all n linearly dependent preferred vector comparisons to be ambiguous.

Figure 8:
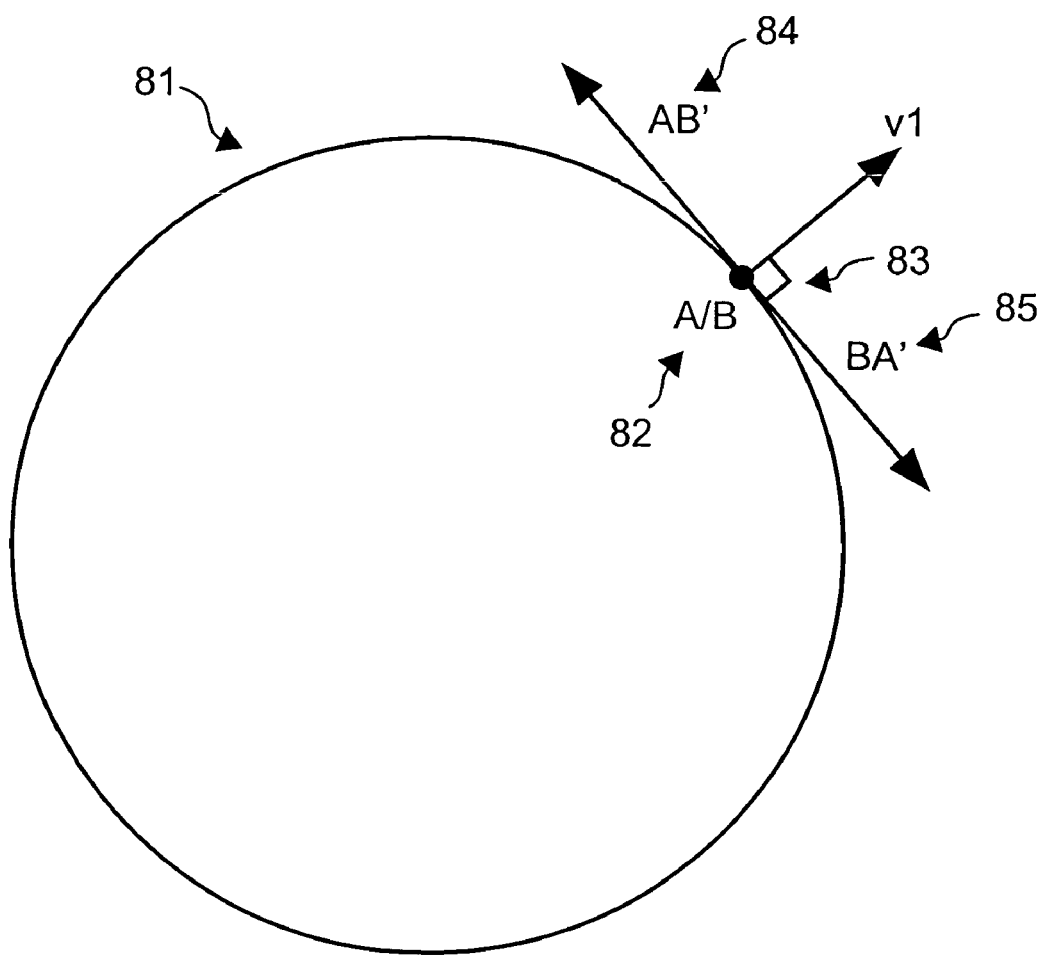
FIG. 8 illustrates the special case of coincident start and end points for a closed curve.

Turning now to FIG. 8, there is shown a closed curve 81, a special case of a finite curve with no clearly defined start or end point. In this instance, either it can be decided that the orientation process applies only to open curves, or a second non-ambiguous technique can be chosen to deal with this case. One example of such a non-ambiguous technique follows.

Given that the only restriction on end points is that all curve points must lie within the interval described by them, then any point on the closed curve may be chosen such that the start point A and end point B are coincident at this chosen point 82. Given no other criteria, it is sensible to choose this coincident start/end position as a point on the curve whose outward normal is most similar to the preferred vector v1 83. Alternatively, the point to be nominated as the coincident start/end point may be chosen randomly along the curve interval, pseudo-randomly for reproducibility, or according to some other relevant criteria. The vectors AB and BA are in fact NULL and have no length or direction. Consequently, alternative vectors AB' 84 and BA' 85 can be defined tangent to the curve at point A/B and heading in opposite directions. Once AB' and BA' have been defined, the same process as previously described for determining orientation in the non-closed case applies. Note that in this particular example, AB' and BA' are perpendicular to the preferred vector v1, so the second preferred vector v2 will be the deciding vector here.

Figure 9:
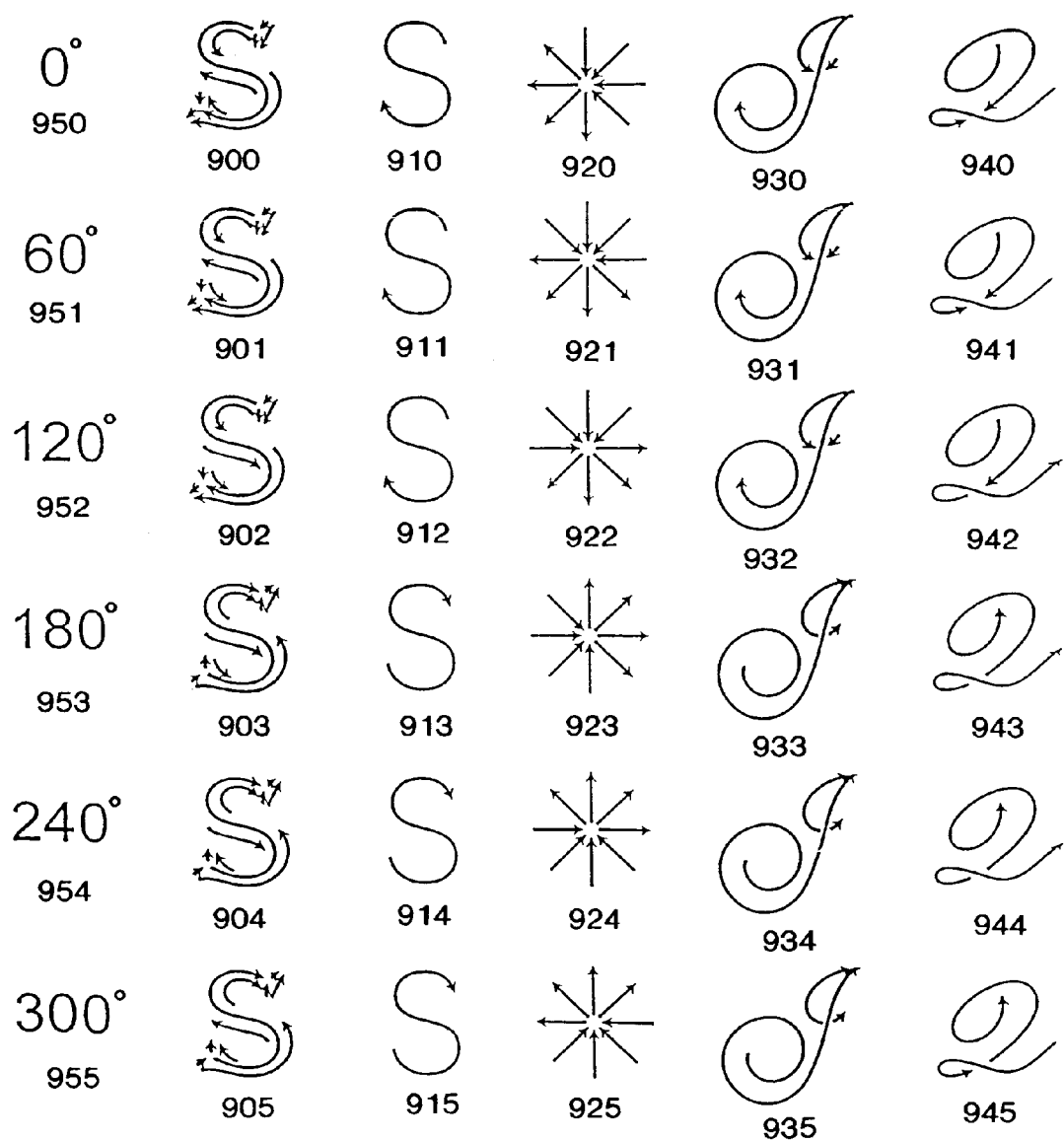
FIG. 9 illustrates a variety of 2-dimensional curves oriented to various preferred directions.

Turning now to FIG. 9, there are shown five different sets of stroke curves. The first curve set 900 to 905 illustrates a group of complex curves representing the character "S". The second curve set 910 to 915 illustrates a single curve of the character "S". The third curve set 920 to 925 represents an asterisk-like character. The fourth curve set 930 to 935 represents a group of complex curves representing the character "I". The fifth curve set 940 to 945 represents a group of complex curves representing the character "Q". Also shown is the direction of the preferred vector $v_1$ measured in degrees (950 to 955) in an anti-clockwise direction from the "9 o'clock" position. The direction of each of the stroke curves of FIG. 9 are shown for each direction of the preferred vector utilising the method described with reference to FIGS. 5A to 7F.

FURTHER EXAMPLES

Figure 10:
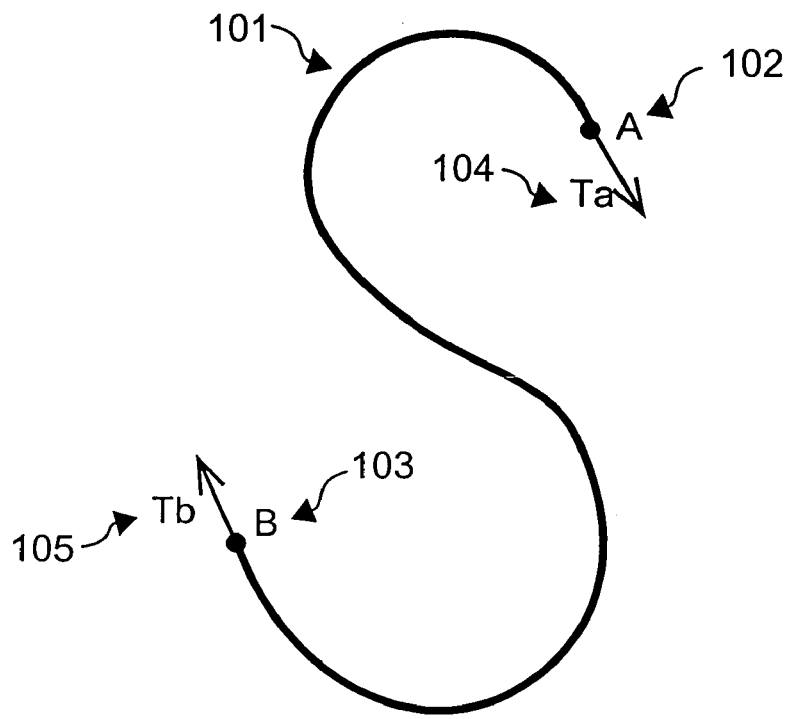
FIG. 10 illustrates an example 2-dimensional curve with end points and end tangent directions shown.

Turning initially to FIG. 10, there is shown a sample 2-dimensional curve describing the path of the character "S" 101. Two end points A 102 and B 103 have been labelled, and the curve is not oriented at this stage. The end points are selected such that all points along the curve lie within the interval formed by these end points. The outwardly directed end tangent associated with end point A, Ta 104, and the outwardly directed end tangent associated with end point B, Tb 105, are also shown. The tangent direction at end points can be calculated by standard mathematical techniques. This is only one way in which the dual "characteristic vectors" Ta and Tb may be calculated. Any process that describes the curve in terms of a dual characteristic vector pair may be applied, for instance integrating the curve to obtain the weighted average direction vector relative to each end.

Figure 11:
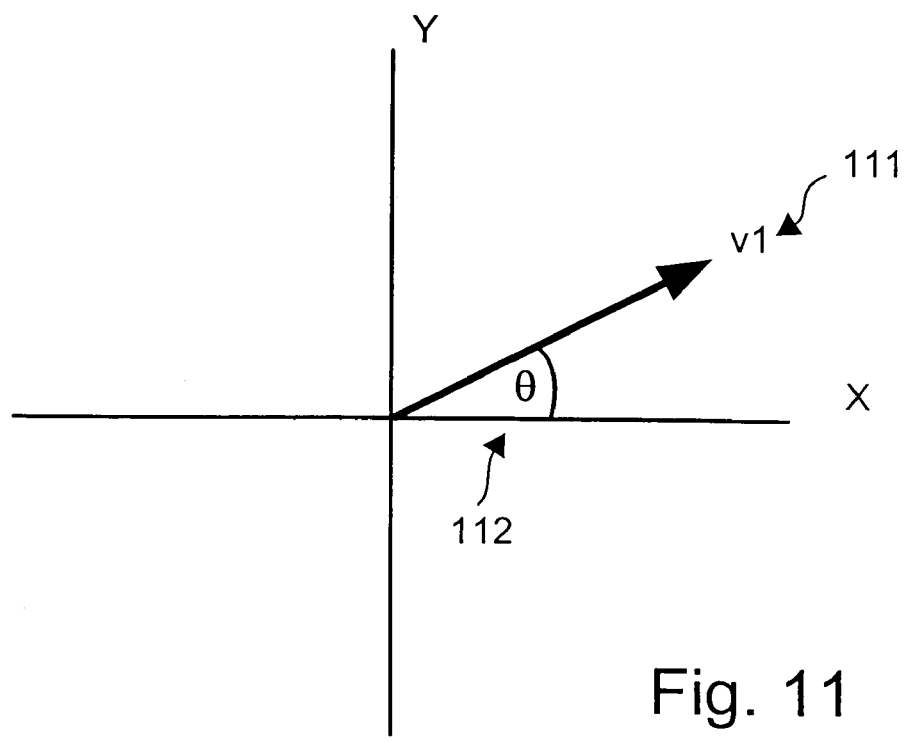
FIG. 11 illustrates an example preferred direction vector for the 2-dimensional case.

Turning to FIG. 11, there is shown the "preferred vector" v1 111 that describes an angle theta 112 with the X-axis. The angle theta is supplied by the user as a single continuous-value parameter, and controls the overall orientation that is enforced on the set of curves to be oriented.

Figure 12A:
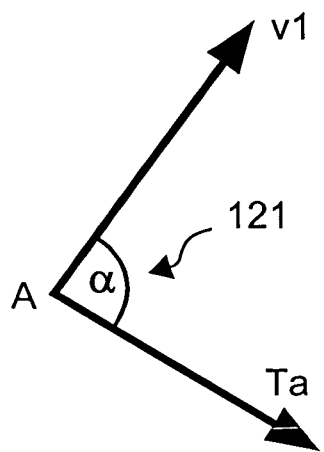
FIGS. 12A and 12B illustrate the relationship between end tangent vectors and the preferred direction vector.
Figure 12B:
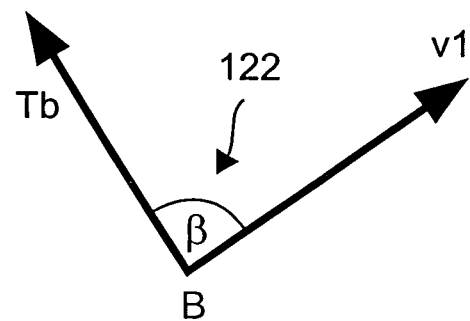

Referring to FIGS. 12A and 12B, there are shown the angles alpha 121 and beta 122 given by the acute angle between vectors Ta and v1, and vectors Tb and v1 respectively. The relative magnitudes of angles alpha and beta define the final orientation of the curve, and can be conveniently calculated as the dot product of the vector pairs. If the magnitude of alpha is less that the magnitude of beta then the curve is described as being oriented "from B to A", and if the magnitude of alpha is greater than the magnitude of beta then the curve is described as being oriented "from A to B".

Figure 13:
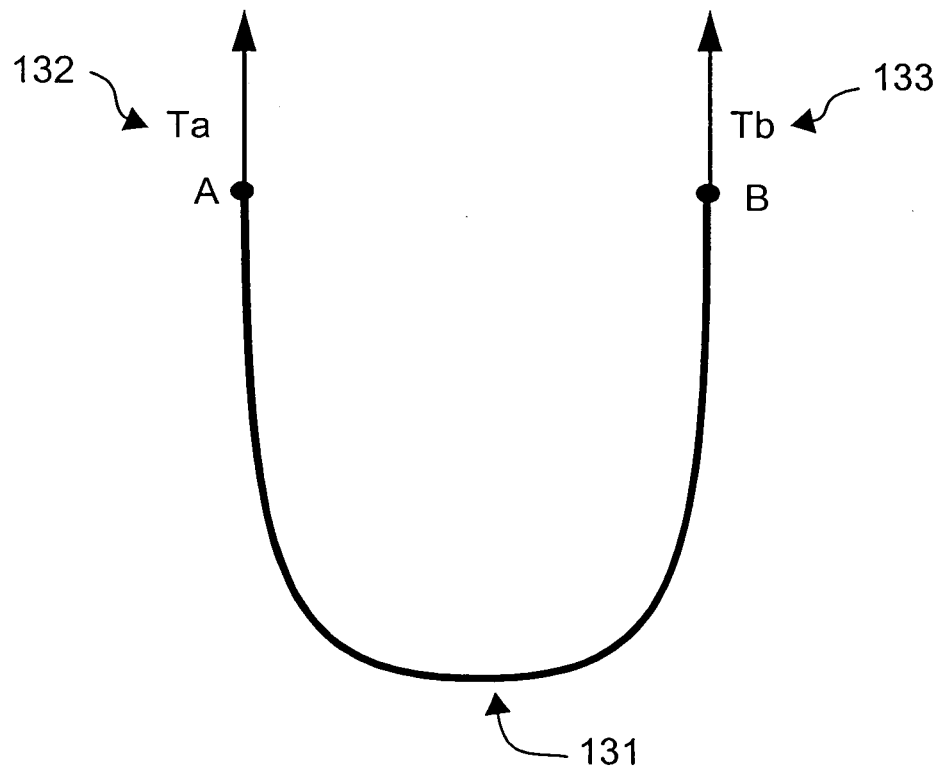
FIG. 13 illustrates the special example of parallel end tangent vectors.
Figure 15A:
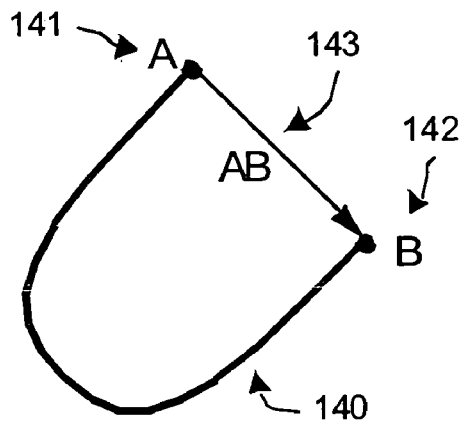
FIGS. 15A to 15F illustrate the resolution of the ambiguous end point case using a second preferred direction.
Figure 15B:
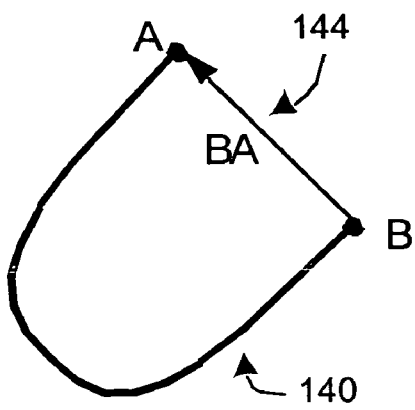
Figure 15C:
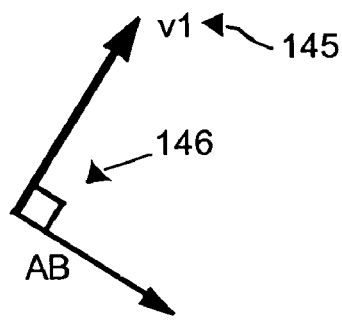
Figure 15D:
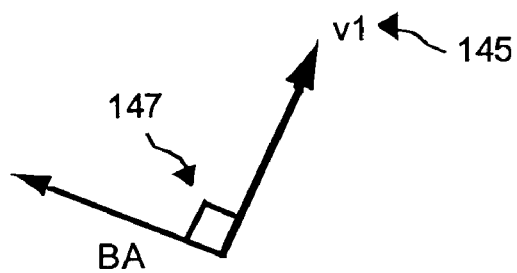
Figure 15E:
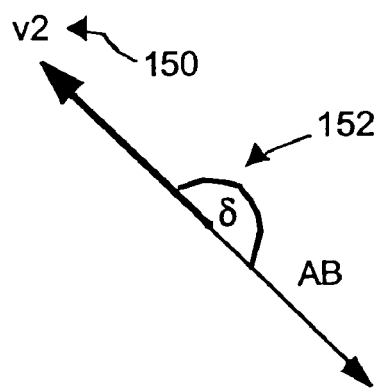
Figure 15F:
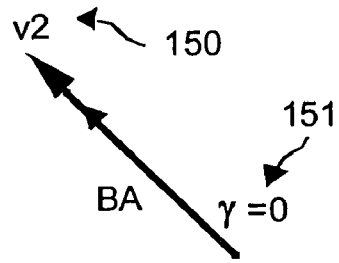

Turning now to FIG. 13, there is shown the special case 131 where alpha and beta are of equal magnitude (end tangent vectors Ta 132 and Tb 133 are parallel). An additional technique can be used to resolve this ambiguity, similar to that described with reference to and illustrated in FIGS. 5A and 5B. This technique is described in more detail with reference to FIGS. 14A to 14D. The end points A 141 and B 142 of the 2-dimensional curve 140 are connected by the vectors AB 143 and BA 144. The angles alpha 146 and beta 147 are given by the acute angle between vectors AB and v1, and vectors BA and v1 respectively. If the magnitude of alpha is less that the magnitude of beta then the curve is described as being oriented "from B to A", and if the magnitude of alpha is greater than the magnitude of beta then the curve is described as being oriented "from A to B". Alternatively, the magnitude of alpha can be compared against a threshold of 90°. If alpha is less than 90° the direction of the curve is "from B to A". If alpha is greater than the 90° threshold then the direction of the curve is "from A to B".

Illustrated in FIGS. 15A to 15F is the case where alpha 146 and beta 147, of the previous example (FIGS. 14C and 14D), are identical (both give a dot product of 0). In this case, both alpha 146 and beta 147 are right angles. A "second preferred vector" v2 150 is used to solve the ambiguity. The second preferred vector v2 150 is selected relative to v1 145 such that it is non-zero and linearly independent of v1 and lies in the 2-dimensional plane occupied by the curve 140. The second preferred vector v2 is used to resolve cases where the preferred vector v1 yields an ambiguous solution. For convenience, v2 is defined to be orthogonal to v1 where direction of orthogonality (left orthogonal or right orthogonal in the 2-dimensional case) is not important provided that the same convention is used consistently. Note that if the second preferred vector is non-zero and linearly independent of the preferred vector, then ambiguity resolution is guaranteed. The second preferred vector v2 150 is used as follows. The angles gamma 151 and delta 152 formed by the vectors AB and BA and v2 are calculated, and their relative magnitude is used to determine the curve's orientation similar to the comparison between alpha and beta. That is, if the magnitude of gamma γ is less than the magnitude of delta then the curve is described as being orientated "from B to A", and if the magnitude of gamma γ is greater than the magnitude of delta, then the curve is described as being orientated "from A to B". For the 2-dimensional case, if alpha and beta are equal in magnitude then it is not possible for gamma and delta to also be of equal magnitude. Alternatively, the magnitude of gamma can be compared against a threshold of 90°. If gamma is less than 90° the direction of the curve is "from B to A". If gamma is greater than the 90° threshold then the direction of the curve is "from A to B".

Figure 16:
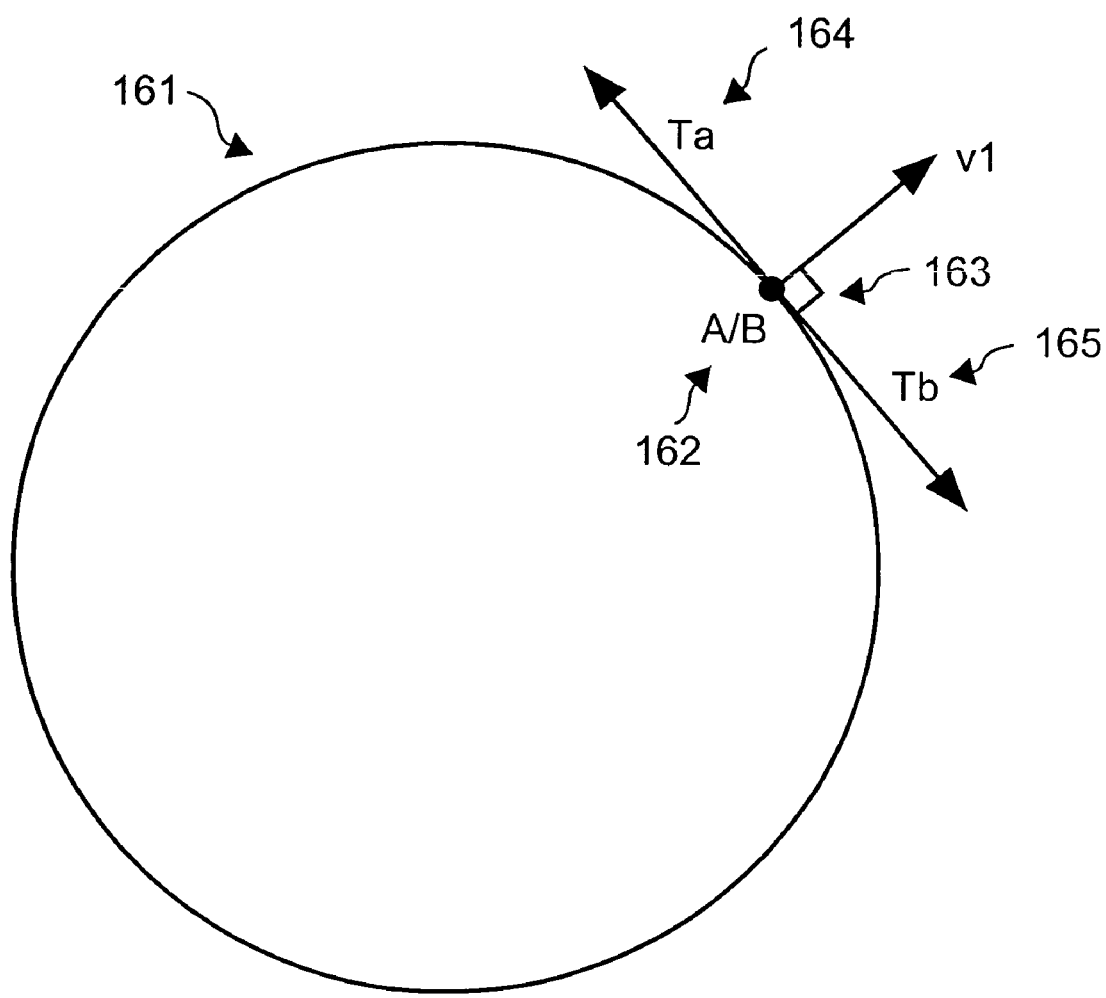
FIG. 16 illustrates the special case of coincident start and end points for a closed curve.

Turning now to FIG. 16, there is shown a closed curve 161, a special case of a finite curve with no clearly defined start or end point. In this instance, either it can be decided that the orientation process applies only to open curves, or a second non-ambiguous technique can be chosen to deal with this case. One example of such a non-ambiguous technique follows.

Given that the only restriction on end points is that all curve points must lie within the interval described by them, then any point on the closed curve may be chosen such that the start point A and end point B are coincident at this chosen point 162. Given no other criteria, it is sensible to choose this coincident start/end position as a point on the curve whose outward normal is most similar to the preferred vector v1 163. Alternatively, the point to be nominated as the coincident start/end point may be chosen randomly along the curve interval, pseudorandomly for reproducibility, or according to some other relevant criteria. The end tangent vectors Ta 164 and Tb 165 are calculated, and the same process as previously described for determining orientation in the non-closed case applies. Note that in this particular example, Ta and Tb are perpendicular to the preferred vector v1, so the second preferred vector v2 will be the deciding vector here.

Figure 17:
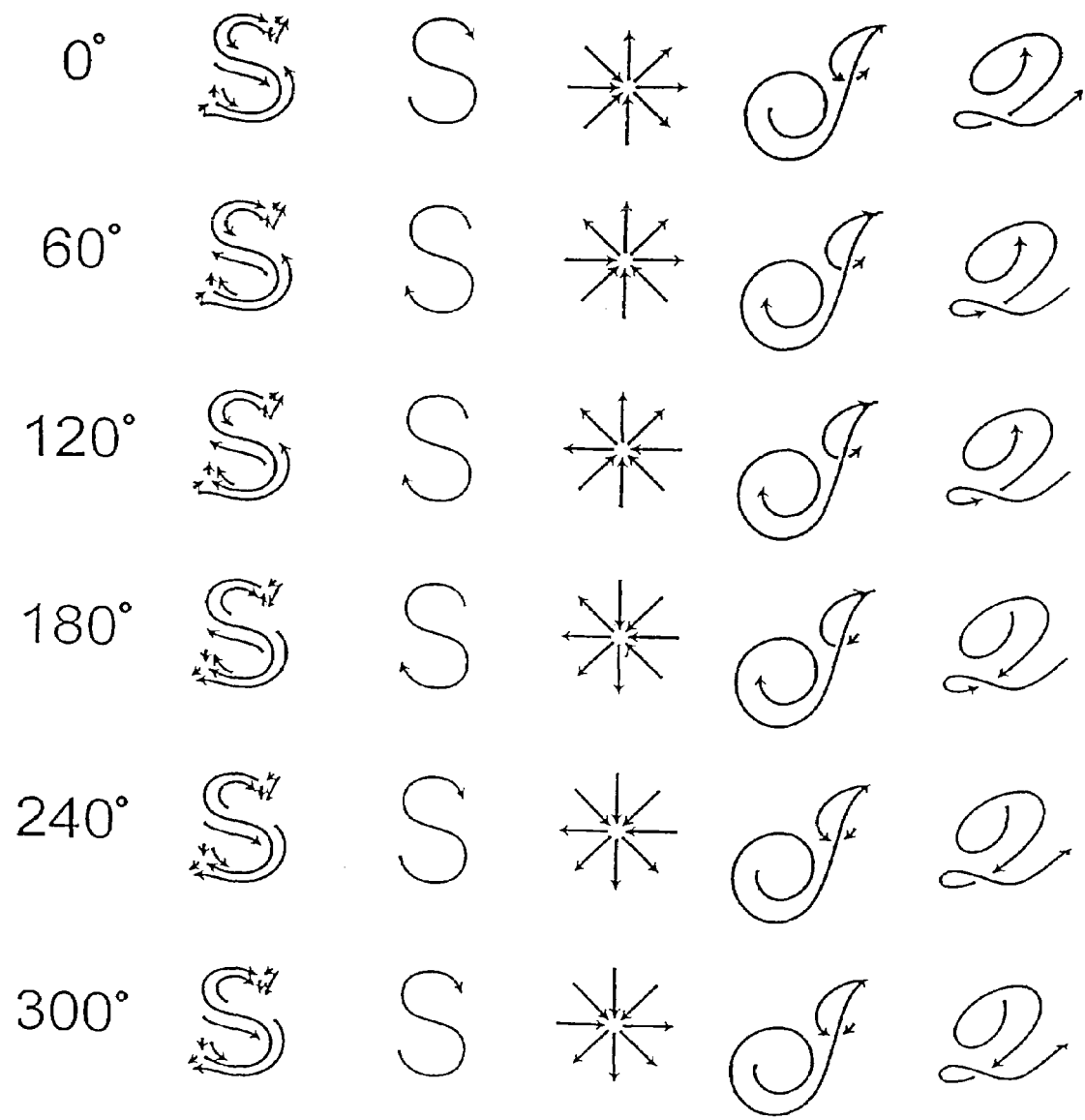
FIG. 17 illustrates a variety of 2-dimensional curves oriented to various preferred directions.

Referring to FIG. 17, there are shown a variety of character shapes described by 2-dimensional stroke paths similar to that shown in FIG. 9. However, in this case, the direction of the preferred vector v1 is measured anti-clockwise from a "3 o'clock" position. Furthermore, the method utilised for orientating the stroke curves is that described with reference to FIGS. 11 to 15F.

If a curve to be oriented is already in an oriented format (that is, it occupies a monotonically increasing interval) then either:

a) the original direction can be retained, or b) the curve can be reoriented, depending on the outcome of the orientation process. If the curve is to be reoriented, this can in general be achieved by relabelling the end points, reversing or reparameterising the curve along its interval, or performing whatever action is relevant to the curve's specific format.

PREFERRED EMBODIMENT OF APPARATUS(S)

Figure 18:
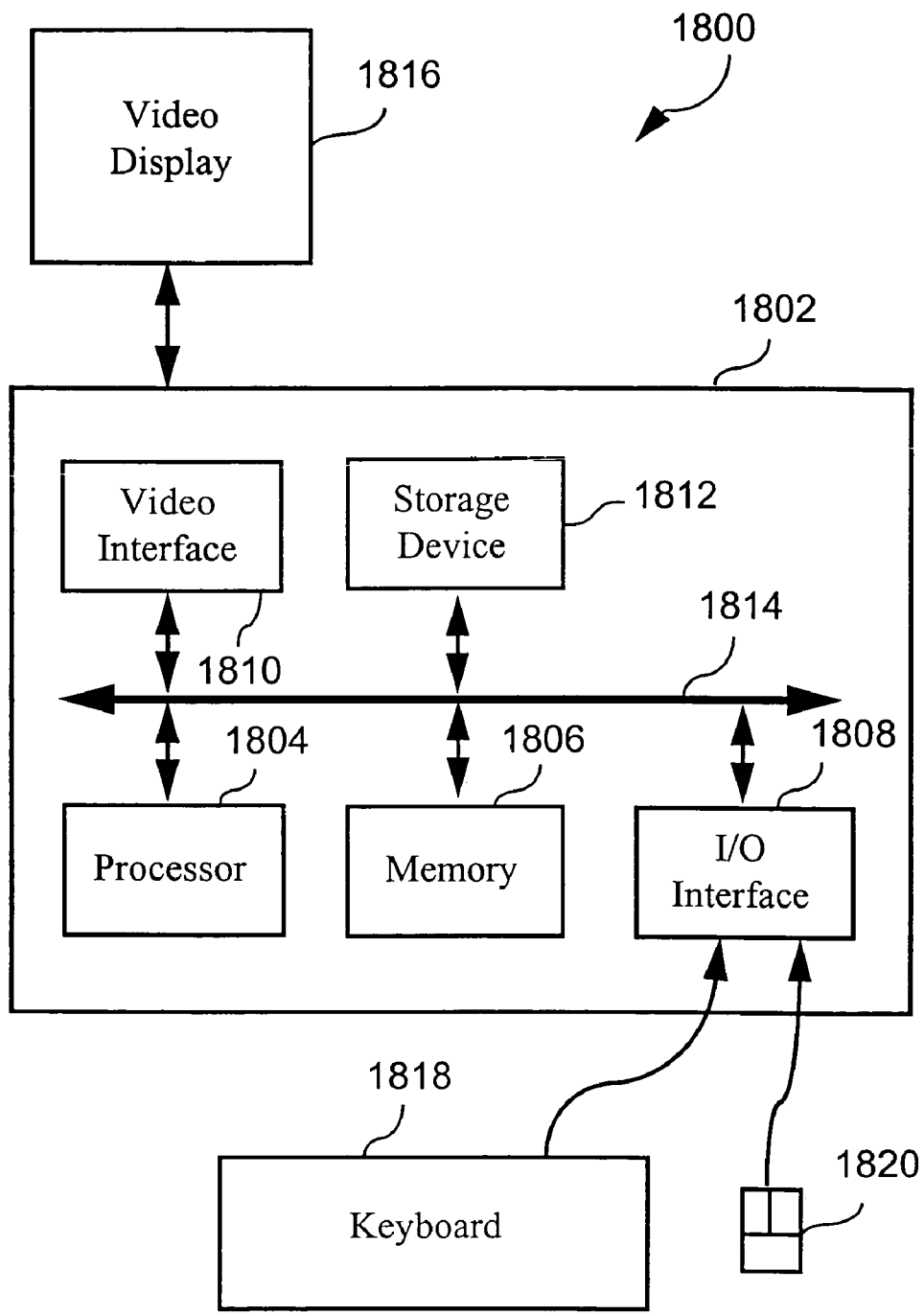
FIG. 18 is a block diagram of a general purpose computer with which the embodiments can be implemented.

The preferred method is preferably practiced using a conventional general-purpose computer, such as the one shown in FIG. 18, wherein the processes of FIGS. 1 to 17 may be implemented as software executing on the computer. In particular, the steps of the method are effected by instructions in the software that are carried out by the computer. The software may be divided into two separate parts; one part for carrying out the orientation method; and another part to manage the user interface between the latter and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for orientating a character stroke or n-dimensional finite space curves in accordance with the embodiments of the invention.

The computer system 1800 consists of the computer 1802, a video display 1816, and input devices 1818, 1820. In addition, the computer system 1800 can have any of a number of other output devices including line printers, laser printers, plotters, and other reproduction devices connected to the computer 1802. The computer system 1800 can be connected to one or more other computers via a communication interface using an appropriate communication channel such as a modem communications path, a computer network, or the like. The computer network may include a local area network (LAN), a wide area network (WAN), an Intranet, and/or the Internet.

The computer 1802 itself consists of a central processing unit(s) (simply referred to as a processor hereinafter) 1804, a memory 1806 which may include random access memory (RAM) and read-only memory (ROM), input/output (IO) interfaces 1808, a video interface 1810, and one or more storage devices generally represented by a block 1812 in FIG. 1. The storage device(s) 1812 can consist of one or more of the following: a floppy disc, a hard disc drive, a magneto-optical disc drive, CD-ROM, magnetic tape or any other of a number of non-volatile storage devices well known to those skilled in the art. Each of the components 1804 to 1812 is typically connected to one or more of the other devices via a bus 1814 that in turn can consist of data, address, and control buses.

The video interface 1810 is connected to the video display 1816 and provides video signals from the computer 1802 for display on the video display 1816. User input to operate the computer 1802 can be provided by one or more input devices 1808. For example, an operator can use the keyboard 1818 and/or a pointing device such as the mouse 1820 to provide input to the computer 1802.

The system 1800 is simply provided for illustrative purposes and other configurations can be employed without departing from the scope and spirit of the invention. Exemplary computers on which the embodiment can be practiced include IBM-PC/ATs or compatibles, one of the Macintosh™ family of PCs, Sun Sparcstation™, or the like. The foregoing are merely exemplary of the types of computers with which the embodiments of the invention may be practiced. Typically, the processes of the embodiments, described hereinafter, are resident as software or a program recorded on a hard disk drive (generally depicted as block 1812 in FIG. 18) as the computer readable medium, and read and controlled using the processor 1804. Intermediate storage of the program and pixel data and any data fetched from the network may be accomplished using the semiconductor memory 1806, possibly in concert with the hard disk drive 1812.

In some instances, the program may be supplied to the user encoded on a CD-ROM or a floppy disk (both generally depicted by block 1812), or alternatively could be read by the user from the network via a modem device connected to the computer, for example. Still further, the software can also be loaded into the computer system 1800 from other computer readable medium including magnetic tape, a ROM or integrated circuit, a magneto-optical disk, a radio or infra-red transmission channel between the computer and another device, a computer readable card such as a PCMCIA card, and the Internet and Intranets including email transmissions and information recorded on websites and the like. The foregoing are merely exemplary of relevant computer readable mediums. Other computer readable mediums may be practiced without departing from the scope and spirit of the invention.

The preferred method of orientation may alternatively be implemented in dedicated hardware such as one or more integrated circuits performing the functions or sub functions of the steps of the method. Such dedicated hardware may include graphic processors, digital signal processors, or one or more microprocessors and associated memories.

INDUSTRIAL APPLICABILITY

The preferred embodiments are general purpose tools and may find applications in many computer graphic process (es). For example, the preferred embodiments may be used in character recognition for stroke-based fonts; evaluation of validity or artistic merit of stroke-base fonts; computerised aids for teaching calligraphic techniques; and application of artistic effects to objects described by arbitrary space curves. Curve orientation is especially important in the area of calligraphy, where incorrectly strokes are easily recognised and indicative of poor technique. The present embodiment (s) may be used to strictly enforce stroke orientation rules intuitively used by artists in the creation of calligraphic designs or similar decorative curve-based artwork on computers.

The foregoing only describes a small number of embodiments of the present invention, however, modifications and/or changes can be made thereto by a person skilled in the art without departing from the scope and spirit of the invention.

What is claimed is:

1. A method of orientating a space curve defined by digital data corresponding to an image, the method comprising the steps of:

receiving a predefined space curve, wherein the space curve has two endpoints and is adapted to have one of two directions, either a forward direction proceeding along the space curve from an initial endpoint to a terminating endpoint or a reverse direction proceeding along the space curve from the terminating endpoint to the initial endpoint;

selecting a desired direction to act as a reference for orientating the space curve received in said receiving step;

generating a first vector having a direction which is the same as the selected desired direction;

generating at least one second vector, each second vector having a corresponding direction representative of and derived from a corresponding characteristic of the space curve;

comparing the first and second vectors;

determining, based on a result of said comparing step, a direction of the space curve, wherein the determined direction of the space curve is one of two directions, either the forward or the reverse direction, that is closest in direction to the selected desired direction; and orientating the direction of the space curve to the determined direction.

2. A method as claimed in claim 1, wherein said step of generating at least one second vector comprises the sub-steps of:

determining the endpoints of the space curve; and
generating one second vector connecting both endpoints.

3. A method as claimed in claim 1, wherein said step of generating at least one second vector comprises the substeps of:

determining the endpoints of the space curve; and
generating two second vectors, each connecting both endpoints and having opposite directions.

4. A method as claimed in claim 3, wherein said step of comparing the first and second vectors comprises the substeps of:

determining a first angle between one of the second vectors and the first vector;

determining a second angle between the other one of the second vectors and the first vector; and comparing the first angle with the second angle,
wherein if the first angle is less than the second angle then the determined direction of the space curve is in a first direction, and if the first angle is greater than the second angle then the determined direction of the space curve is in a second direction, opposite the first direction.

5. A method as claimed in claim 2, wherein said step of comparing the first and second vectors comprises the sub-steps of:

determining a first angle between the first vector and the second vector; and comparing the first angle with a first threshold value,
wherein if the first angle is less than the first threshold value then the determined direction of the space curve is in a first direction, and if the first angle is greater than the first threshold value then the determined direction of the space curve is in a second direction, opposite the first direction.

6. A method as claimed in claim 5, wherein the first threshold value is 90°.

7. A method as claimed in claim 4, wherein the method further comprises the step of generating a vector orthogonal to the first vector.

8. A method as claimed in claim 5, wherein the method further comprises the step of generating a vector orthogonal to the first vector.

9. A method as claimed in claim 7 or 8, wherein the orthogonal vector is generated in a predetermined manner.

10. A method as claimed in claim 7 or 8, wherein the orthogonal vector is generated in accordance with a user selected direction.

11. A method as claimed in claim 7, wherein, if the first angle equals the second angle, said step of comparing the first and second vectors further comprises the sub-steps of:

determining a third angle between one of the second vectors and the orthogonal vector;

determining a fourth angle between the other one of the second vectors and the orthogonal vector; and comparing the third angle with the fourth angle,
wherein if the third angle is less than the fourth angle then the determined direction of the space curve is in a third direction, and if the third angle is greater than the fourth angle then the determined direction of the space curve is in a fourth direction, opposite the third direction.

12. A method as claimed in claim 8, wherein if the first angle equals the first threshold value, said step of comparing the first and second vectors further comprises the sub-steps of:

determining a second angle between the second vector and the orthogonal vector; and comparing the second angle with a second threshold value,
wherein if the second angle is less than the second threshold value then the determined direction of the space curve is in a third direction, and if the second angle is greater than the second threshold value then the determined direction of the space curve is in a fourth direction, opposite the third direction.

13. A method as claimed in claim 12, wherein the second threshold value is 90°.

14. A method as claimed in claim 1, wherein said step of generating at least one second vector comprises the substeps of:

determining endpoints of the space curve; and
generating, at each endpoint, a second vector tangent to the space curve.

15. A method as claimed in claim 14, wherein said step of comparing the first and second vectors comprises the sub-steps of:

determining a first angle between one of the second vectors and the first vector;

determining a second angle between the other one of the second vectors and the first vector; and comparing the first angle with the second angle,
wherein if the first angle is less than the second angle then the determined direction of the space curve is in a first direction, and if the first angle is greater than the second angle then the determined direction of the space curve is in a second direction, opposite the first direction.

16. A method as claimed in claim 15, wherein said step of generating at least one second vector further comprises the sub-step of generating a third vector connecting both endpoints.

17. A method as claimed in claim 15, wherein said step of generating at least one second vector further comprises the sub-step of generating two third vectors, each connecting both endpoints and having opposite directions.

18. A method as claimed in claim 17, wherein said step of comparing the first and second vectors further comprises the sub-steps of:

determining a third angle between one of the third vectors and the first vector;

determining a fourth angle between the other one of the third vectors and the first vector; and comparing the third angle with the fourth angle,
wherein if the third angle is less than the fourth angle then the determined direction of the space curve is in a third direction, and if the third angle is greater than the fourth angle then the determined direction of the space curve is in a fourth direction, opposite the third direction.

19. A method as claimed in claim 16, wherein said step of comparing the first and second vectors comprises the sub-steps of:
   determining a third angle between the third vector and the first vector; and
   comparing the third angle with a first threshold value,
   wherein if the third angle is less than the first threshold value then the determined direction of the space curve is in a third direction, and if the third angle is greater than the first threshold value then the determined direction of the space curve is in a fourth direction, opposite the third direction.

20. A method as claimed in claim 19, wherein the first threshold value is 90°.

21. A method as claimed in claim 18, wherein said step of generating at least one second vector comprises the sub-step of generating a vector orthogonal to the first vector.

22. A method as claimed in claim 19, wherein said step of generating at least one second vector comprises the sub-step of generating a vector orthogonal to the first vector.

23. A method as claimed in claim 21 or 22, wherein the orthogonal vector is generated in a predetermined manner.

24. A method as claimed in claim 21 or 22, wherein the orthogonal vector is generated in accordance with a user selected direction.

25. A method as claimed in claim 21, wherein if the third angle equals the fourth angle, said step of comparing the first and second vectors further comprises the sub-steps of:
   determining a fifth angle between the first one of the third vectors and the orthogonal vector;
   determining a sixth angle between the other one of the third vectors and the orthogonal vector; and
   comparing the fifth angle with the sixth angle,
   wherein if the fifth angle is less than the sixth angle then the determined direction of the space curve is in a fifth direction, and if the fifth angle is greater than the sixth angle then the determined direction of the space curve is in a sixth direction, opposite the fifth direction.

26. A method as claimed in claim 22, wherein if the third angle equals the first threshold value, said step of comparing the first and second vectors comprises the sub-steps of:
   determining a fourth angle between the third vector and the orthogonal vector; and
   comparing the fourth angle with a second threshold value,
   wherein if the fourth angle is less than the second threshold value then the determined direction of the space curve is in a fourth direction, and if the fourth angle is greater than the second threshold value then the determined direction of the space curve is in a fifth direction, opposite the fourth direction.

27. A method as claimed in claim 26, wherein the second threshold value is 90°.

28. A method as claimed in claim 1, wherein the method comprises the step of providing further space curves and performing said step of generating at least one second vector, said step of comparing the first and second vectors, and said step of orientating the direction of the space curve on each space curve.

29. A method as claimed in claim 1, wherein the method comprises a plurality of techniques for generating the second vectors and a step for selecting one of the techniques in response to user input.

30. An apparatus for orientating a space curve defined by digital data corresponding to an image, the apparatus comprising:
   selection means for selecting a desired direction to act as a reference for orientating the space curve;
   first generation means for generating a first vector having a direction which is the same as the selected desired direction;
   means for receiving a predefined space curve, wherein the space curve has two endpoints and is adapted to have one of two directions, either a forward direction proceeding along the space curve from an initial endpoint to a terminating endpoint or a reverse direction proceeding along the space curve from the terminating endpoint to the initial endpoint;
   second generation means for generating at least one second vector, each second vector having a corresponding direction representative of and derived from a corresponding characteristic of the space curve;
   first comparison means for comparing the first and second vectors;
   determining means for determining, based on an output of said first comparison means, a direction of the space curve, wherein the determined direction of the space curve is one of two directions, either the forward or the reverse direction, that is closest in direction to the selected desired direction; and
   orientation means for orientating the direction of the space curve to the determined direction.

31. An apparatus claimed in claim 30, wherein said second generation means comprises:
   means for determining the endpoints of the space curve; and
   means for generating a second vector connecting both endpoints.

32. An apparatus as claimed in claim 30, wherein said second generating means comprises:
   means for determining the endpoints of the space curve; and
   means for generating two second vectors, each connecting both endpoints and having opposite directions.

33. An apparatus as claimed in claim 32, wherein said first comparison means comprises:
   means for determining a first angle between one of the second vectors and the first vector;
   means for determining a second angle between the other one of the second vectors and the first vector;
   means for comparing the first angle with the second angle,
   wherein if the first angle is less than the second angle then the determined direction of the space curve is in a first direction, and if the first angle is greater than the second angle then the determined direction of the space curve is in a second direction, opposite the first direction.

34. An apparatus as claimed in claim 31, wherein said first comparison means comprises:
   means for determining a first angle between the first vector and the second vector; and
   means for comparing the first angle with a first threshold value,
   wherein if the first angle is less than the first threshold value then the determined direction of the space curve is in a first direction, and if the first angle is greater than the first threshold value then the determined direction of the space curve is in a second direction, opposite the first direction.

35. An apparatus as claimed in claim 34, wherein the first threshold value is 90°.

36. An apparatus as claimed in claim 33, wherein the apparatus further comprises means for generating a vector orthogonal to the first vector.

37. An apparatus as claimed in claim 34, wherein the apparatus further comprises means for generating a vector orthogonal to the first vector.

38. An apparatus as claimed in claim 36 or 37, wherein the orthogonal vector is generated in a predetermined manner.

39. An apparatus as claimed in claim 36 or 37, wherein the orthogonal vector is generated in accordance with a user selected direction.

40. An apparatus as claimed in claim 36, wherein the first comparison means further comprises:
   means for determining a third angle between one of the second vectors and the orthogonal vector;
   means for determining a fourth angle between the other one of the second vectors and the orthogonal vector; and
   means for comparing the third angle with the fourth angle,
   wherein if the third angle is less than the fourth angle then the determined direction of the space curve is in a third direction, and if the third angle is greater than the fourth angle then the determined direction of the space curve is in a fourth direction, opposite the third direction.

41. An apparatus as claimed in claim 37, wherein the first comparison means further comprises:
   means for determining a second angle between the second vector and the orthogonal vector; and
   means for comparing the second angle with a second threshold value,
   wherein if the second angle is less than the second threshold value then the determined direction of the space curve is in a third direction, and if the second angle is greater than the second threshold value then the determined direction of the space curve is in a fourth direction, opposite the third direction.

42. An apparatus as claimed in claim 41, wherein the second threshold value is 90°.

43. An apparatus as claimed in claim 30, wherein said second generation means comprises:
   means for determining endpoints of the curve; and
   means for generating, at each endpoint, a second vector tangent to the curve.

44. An apparatus as claimed in claim 43, wherein said first comparison means comprises:
   means for determining a first angle between one of the second vectors and the first vector;
   means for determining a second angle between the other one of the second vectors and the first vector; and
   means for comparing the first angle with the second angle,
   wherein if the first angle is less than the second angle then the determined direction of the space curve is in a first direction, and if the first angle is greater than the second angle then the determined direction of the space curve is in a second direction, opposite the first direction.

45. An apparatus as claimed in claim 44, wherein said second generation means comprises means for generating a third vector connecting both endpoints.

46. An apparatus as claimed in claim 44, wherein said second generation means further comprises means for generating two third vectors, each connecting both endpoints and having opposite directions.

47. An apparatus as claimed in claim 46, wherein said first comparison means further comprises:
   means for determining a third angle between one of the third vectors and the first vector;
   means for determining a fourth angle between the other one of the third vectors and the first vector; and
   means for comparing the third angle with the fourth angle,
   wherein if the third angle is less than the fourth angle then the determined direction of the space curve is in a third direction, and if the third angle is greater than the fourth angle then the determined direction of the space curve is in a fourth direction, opposite the third direction.

48. An apparatus as claimed in claim 45, wherein said first comparison means comprises:
   means for determining a third angle between the third vector and the first vector; and
   means for comparing the third angle with a first threshold value,
   wherein if the third angle is less than the first threshold value then the determined direction of the space curve is in a third direction, and if the third angle is greater than the first threshold value then the determined direction of the space curve is in a fourth direction, opposite the third direction.

49. An apparatus as claimed in claim 48, wherein the first threshold value is 90°.

50. An apparatus as claimed in claim 47, wherein said second generation means comprises means for generating a vector orthogonal to the first vector.

51. An apparatus as claimed in claim 48, wherein said second generation means comprises means for generating a vector orthogonal to the first vector.

52. An apparatus as claimed in claim 50 or 51, wherein the orthogonal vector is generated in a predetermined manner.

53. An apparatus as claimed in claim 50 or 51, wherein the orthogonal vector is generated in accordance with a user selected direction.

54. An apparatus as claimed in claim 50, wherein the first comparison means further comprises:
   means for determining a fifth angle between the first one of the third vectors and the orthogonal vector;
   means for determining a sixth angle between the other one of the third vectors and the orthogonal vector; and
   means for comparing the fifth angle with the sixth angle,
   wherein if the fifth angle is less than the sixth angle then the determined direction of the space curve is in a fifth direction, and if the fifth angle is greater than the sixth angle then the determined direction of the space curve is in a sixth direction, opposite the fifth direction.

55. An apparatus as claimed in claim 51, wherein the first comparison means further comprises:
   means for determining a fourth angle between the third vector and the orthogonal vector; and
   means for comparing the fourth angle with a second threshold value,
   wherein if the fourth angle is less than the second threshold value then the determined direction of the space curve is in a fourth direction, and if the fourth angle is greater than the second threshold value then the determined direction of the space curve is in a fifth direction, opposite the fourth direction.

56. An apparatus as claimed in claim 55, wherein the second threshold value is 90°.

57. An apparatus as claimed in claim 30, wherein the apparatus comprises means for providing further space curves and performing the operations of said second generation means, first comparison means and orientation means on each space curve.

58. An apparatus as claimed in claim 30, wherein the apparatus comprises a plurality of techniques for generating the second vectors and means for selecting one of the techniques in response to user input.

59. A computer program product comprising a computer readable medium having a computer program for controlling the operation of a data processing apparatus on which the computer program executes to perform a method for orientating a space curve defined by digital data corresponding to an image, the computer program product comprising:

selection means for selecting a desired direction to act as a reference for orientating the space curve;

first generation means for generating a first vector having a direction which is the same as the selected desired direction;

means for receiving a predefined space curve, wherein the space curve has two endpoints and is adapted to have one of two directions, either a forward direction proceeding along the space curve from an initial endpoint to a terminating endpoint or a reverse direction proceeding along the space curve from the terminating endpoint to the initial endpoint;

second generation means for generating at least one second vector, each second vector having a corresponding direction representative of and derived from a corresponding characteristic of the space curve;

first comparison means for comparing the first and second vectors so as to determine a direction of the space curve, wherein the determined direction of the space curve is one of two directions, either the forward or the reverse direction, that is closest in direction to the selected desired direction; and orientation means for orientating the direction of the space curve to the determined direction.

60. A computer program product claimed in claim 59, wherein said second generation means comprises:

means for determining the endpoints of the space curve; and means for generating one second vector connecting both endpoints.

61. A computer program product as claimed in claim 59, wherein said second generating means comprises:

means for determining the endpoints of the space curve; and means for generating two second vectors, each connecting both endpoints and having opposite directions.

62. A computer program product as claimed in claim 61, wherein said first comparison means comprises:

means for determining a first angle between one of the second vectors and the first vector;

means for determining a second angle between the other one of the second vectors and the first vector; and means for comparing the first angle with the second angle, wherein if the first angle is less than the second angle then the determined direction of the space curve is in a first direction, and if the first angle is greater than the second angle then the determined direction of the space curve is in a second direction, opposite the first direction.

63. A computer program product as claimed in claim 60, wherein said first comparison means comprises:

means for determining a first angle between the first vector and the second vector; and means for comparing the first angle with a first threshold value, wherein if the first angle is less than the first threshold value then the determined direction of the space curve is in a first direction, and if the first angle is greater than the first threshold value then the determined direction of the space curve is in a second direction, opposite the first direction.

64. A computer program product as claimed in claim 63, wherein the first threshold value is 90°.

65. A computer program product as claimed in claim 62, wherein the computer program product further comprises means for generating a vector orthogonal to the first vector.

66. A computer program product as claimed in claim 63, wherein the computer program product further comprises means for generating a vector orthogonal to the first vector.

67. A computer program product as claimed in claim 65 or 66, wherein the orthogonal vector is generated in a predetermined manner.

68. A computer program product as claimed in claim 65 or 66, wherein the orthogonal vector is generated in accordance with a user selected direction.

69. A computer program product as claimed in claim 65, wherein said first comparison means further comprises:

means for determining a third angle between one of the second vectors and the orthogonal vector;

means for determining a fourth angle between the other one of the second vectors and the orthogonal vector; and means for comparing the third angle with the fourth angle, wherein if the third angle is less than the fourth angle then the determined direction of the space curve is in a third direction, and if the third angle is greater than the fourth angle then the determined direction of the space curve is in a fourth direction, opposite the third direction.

70. A computer program product as claimed in claim 66, wherein said first comparison means further comprises:

means for determining a second angle between the second vector and the orthogonal vector; and means for comparing the second angle with a second threshold value, wherein if the second angle is less than the second threshold value then the determined direction of the space curve is in a third direction, and if the second angle is greater than the second threshold value then the determined direction of the space curve is in a fourth direction, opposite the third direction.

71. A computer program product as claimed in claim 70, wherein the second threshold value is 90°.

72. A computer program product as claimed in claim 59, wherein said second generation means comprises:

means for determining endpoints of the space curve; and means for generating, at each endpoint, a second vector tangent to the space curve.

73. A computer program product as claimed in claim 72, wherein said first comparison means comprises:

means for determining a first angle between one of the second vectors and the first vector;

means for determining a second angle between the other one of the second vectors and the first vector; and means for comparing the first angle with the second angle, wherein if the first angle is less than the second angle then the determined direction of the space curve is in a first direction, and if the first angle is greater than the second angle then the determined direction of the space curve is in a second direction, opposite the first direction.

74. A computer program product as claimed in claim 73, wherein said second generation means comprises means for generating one third vector connecting both endpoints.

75. A computer program product as claimed in claim 73, wherein said second generation means further comprises means for generating two third vectors, each connecting both endpoints and having opposite directions.

76. A computer program product as claimed in claim 75, wherein said first comparison means further comprises:

means for determining a third angle between one of the third vectors and the first vector;

means for determining a fourth angle between the other one of the third vectors and the first vector; and means for comparing the third angle with the fourth angle, wherein if the third angle is less than the fourth angle then the determined direction of the space curve is in a third direction, and if the third angle is greater than the fourth angle then the determined direction of the space curve is in a fourth direction, opposite the third direction.

77. A computer program product as claimed in claim 74, wherein said first comparison means comprises:

means for determining a third angle between the third vector and the first vector; and means for comparing the third angle with a first threshold value, wherein if the third angle is less than the first threshold value then the determined direction of the space curve is in a third direction, and if the third angle is greater than the first threshold value then the determined direction of the space curve is in a fourth direction, opposite the third direction.

78. A computer program product as claimed in claim 77, wherein the first threshold value is 90°.

79. A computer program product as claimed in claim 76, wherein said second generation means comprises means for generating a vector orthogonal to the first vector.

80. A computer program product as claimed in claim 77, wherein said second generation means comprises means for generating a vector orthogonal to the first vector.

81. A computer program product as claimed in claim 79 or 80, wherein the orthogonal vector is generated in a predetermined manner.

82. A computer program product as claimed in claim 79 or 80, wherein the orthogonal vector is generated in accordance with a user selected direction.

83. A computer program product as claimed in claim 79, wherein said first comparison means further comprises:

means for determining a fifth angle between the first one of the third vectors and the orthogonal vector;

means for determining a sixth angle between the other one of the third vectors and the orthogonal vector; and means for comparing the fifth angle with the sixth angle, wherein if the fifth angle is less than the sixth angle then the determined direction of the space curve is in a fifth direction, and if the fifth angle is greater than the sixth angle then the determined direction of the space curve is in a sixth direction, opposite the fifth direction.

84. A computer program product as claimed in claim 80, wherein said first comparison means further comprises:

means for determining a fourth angle between the third vector and the orthogonal vector; and means for comparing the fourth angle with a second threshold value, wherein if the fourth angle is less than the second threshold value then the determined direction of the space curve is in a fourth direction, and if the fourth angle is greater than the second threshold value then the determined direction of the space curve is in a fifth direction, opposite the fourth direction.

85. A computer program product as claimed in claim 84, wherein the second threshold value is 90°.

86. A computer program product as claimed in claim 59, wherein the computer program product comprises means for providing further space curves and performing the operations of said second generation means, first comparison means and orientation means on each space curve.

87. A computer program product as claimed in claim 59, wherein the computer program product comprises a plurality of techniques for generating the second vectors and means for selecting one of the techniques in response to user input.

* * * * *